Patented Apr. 26, 1949

2,468,600

UNITED STATES PATENT OFFICE 2,468,600

WATER-INSOLUBLE MONOAZO DYE

Hans Z. Lecher, Plainfield, and Frederic H. Adams, Bound Brook, N. J., assignors to American Cyanamid Company, New York, N. Y., a corporation of Maine No Drawing. Application December 29, 1945, Serial No. 638,503

1 Claim. (Cl. 260—204)

This invention relates to new water-insoluble monoazo dye represented by the formula:

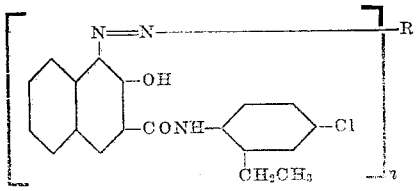

wherein R is the residue of a diazotized aromatic amine free from water-solubilizing substituents and n is an integer selected from the group consisting of 1 and 2.

It has been discovered that the products of the present invention are valuable new azo dyestuffs for the production of printing inks and paints because of their specific resistance to "bleed" in the vehicles and solvents used in their formulation, and their superior resistance to fading upon exposure to ultra-violet light. It has further been discovered that the products of the present invention are valuable for coloring cellulosic materials because of their high tinctorial power and the resistance of such developed dyeings to the fading action of ultra-violet light.

It could not be predicted that the products of the present invention would show colors so different from known analogous products and that the products of the present invention would further show such improved properties as non-bleeding in lacquer-type solvents and resistance to fading by the action of ultra-violet light that are not fully possessed by the known analogous products.

The products of the present invention may be readily obtained by coupling of the diazotized aromatic amines that are free from water-solubilizing substituents with 2-hydroxy-3-naphthoic acid-2'-ethyl-4'-chloroanilide in alkaline solution, or as is preferred, the coupling may be carried out in weakly acid solution. Production of the compounds of the present invention may be accomplished with or without a substrate, as for example, their formation in the presence of organic and inorganic extenders. They may equally well be produced on the fiber of textile materials by the well known dyeing and printing procedures wherein the colors are developed upon cellulosic fiber from application of the diazotized bases, salts or double salts of the diazonium compounds or from diazoamino compounds. When the products are produced in substance, they may be isolated by filtration and dried, or they may be flushed directly into the vehicle into which they are to be employed.

Some typical aromatic amines suitable for preparation of the products of the present invention are, for example aniline, its homologs, the halogen, nitro, alkoxy, aryloxy, acylamino, sulfonamide and cyano derivatives, the naphthylamines, benzidine, ortho-dianisidine, 3,3'-dichlorbenzidine, ortho-tolidine and the like. The amino compound may contain more than one substituent and these may be the same or different, such as, for example, 2-nitro-4-chloroaniline.

The invention is more fully illustrated in conjunction with the following examples which are meant to be illustrative only and not by way of limitation. All parts are by weight unless otherwise noted.

EXAMPLE 1

2- hydroxy-3-naphthoic-2'-ethyl-4'-chloroanilide

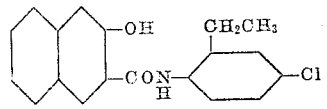

A suitable vessel is charged with 40 parts of pyridine, 7.8 parts of 5-chloro-2-amino ethylbenzene, and 10.5 parts of the chloride of 2-hydroxy-3-naphthoic acid. The mixture is refluxed for 1 hour and is poured into 250 parts of cold water. The yellowish-gray precipitate which forms is then filtered off. The filter cake is slurried in fresh water and the insoluble product is filtered again and dried. Crystallized from alcohol, it melts at 209.5–210° C. (corr.).

EXAMPLE 2

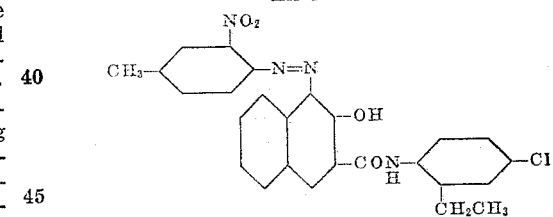

1.52 parts of 3-nitro-4-amino toluene are mixed with 50 parts of water and 10 parts of 17% hydrochloric acid. Ice is added to reduce the temperature to 2° C., and to the resulting cold slurry is added a solution of 0.7 part of sodium nitrite in 10 parts of water. The mixture is stirred until diazotization is complete, and the resulting diazo solution is clarified by filtering with diatomaceous earth.

3.42 parts of 2-hydroxy-3-naphthoic acid-2'-ethyl-4'-chloroanilide is made into a paste with 0.25 part of Turkey-Red oil and 6 parts of 20% sodium hydroxide. One hundred parts of water are then added and the mixture is heated with stirring to complete the solution. The solution is diluted with 50 parts of water and 11 parts of 25% solution of sodium acetate trihydrate, and the temperature is adjusted to 24° C. by the addition of ice.

To this alkaline solution the diazo is added with rapid stirring. A slurry of red pigment results, which, after all the diazo has been added, is acid to methyl red yellow test paper but not acid to Congo Red test paper.

The temperature is raised to 90° C., and then cold water is added to reduce the temperature to 65° C. The pigment is filtered off by suction, washed on the filter until the washings are no longer acid to methyl red yellow paper, and dried at 46° C.

A second product is prepared by the same procedure except that 3.27 parts of the known 2 - hydroxy - 3 - naphthoic acid - 2' - methyl - 4' - chloroanilide are substituted for the 2-hydroxy-3-naphthoic acid-2'-ethyl-4'-chloroanilide.

EXAMPLE 3

The colored products prepared as described in Example 2 are converted to inks for comparison by separately dispersing with uniform hand-mulling 1.0 part of each of the pigments in 1.5 parts of lithographic varnish #1 with drier. The ink so produced is drawn-down lightly on white paper for masstone comparison. Samples of the same inks are drawn down on white paper with considerable pressure to produce thin films for undertone comparison. Additional samples of 1.0 part each of the masstone inks are mixed with 50 parts of zinc oxide paste until homogeneous and this mixture is drawn down lightly on white paper for tint comparison. Light fastness tests are made by exposure of the dried tint in a standard type Fade-Ometer.

"Bleed in white lacquer" is determined by spraying white lacquer on a portion of the dried, thin film draw down described above for undertone comparison. The "bleed" is determined by the amount of staining through of the colored pigment.

Linseed oil bleed is determined by spotting a sample of the masstone ink on white filter paper and observing to what extent the oil penetration into the paper is colored.

Results of these tests upon the products of Example 2 are summarized below and show that this product of the present invention possesses light fastness properties and "non-bleeding" properties that are unpredictable improvements over the known art.

EXAMPLE 4

Grounding baths

Two cotton skeins weighing 5 parts each are boiled out in ½% soap solution, rinsed in fresh water and dried.

Skein #1

One of the cotton skeins is turned for 15 minutes in a grounding bath containing 0.5 part of 2-hydroxy-3-naphthoic acid-2'-ethyl-4'-chloroanilide, 2 parts alcohol, 3.5 parts of 20% sodium hydroxide and 100 parts of water, removed and wrung out.

Skein #2

One of the cotton skeins is turned in a similar bath containing 0.5 part of the known 2-hydroxy-3-naphthoic acid-2'-methyl-4'-chloroanilide in place of the 2-hydroxy-3-naphthoic acid-2'-ethyl - 4' - chloroanilide, removed and wrung out.

Developing baths 0.6 part of zinc chloride double salt derived from diazotized 3-nitro-4-amino anisole, previously diluted with magnesium sulfate dihydrate to 19% strength, calculated the basis of the amine taken, are dissolved in 299 parts of water and 1 part of glacial acetic acid is added.

100 parts by volume of this diazo solution are taken and Skein #1 is turned in this bath to full color development.

100 parts by volume of this diazo solution are taken and Skein #2 is turned in this bath to full color development.

The dyed skeins are separately rinsed in fresh water, treated at the boil in ½% soap solution, rinsed again and dried.

Results of the dyeings so obtained are summarized below showing the different colors obtained from the products of the present invention and the improved properties of tinctorial strength and light fastness over the known art.

| Skein No. | Diazo Component | Coupling Component | Color of Dyeing | Light Fastness, 60 Hours Exposure |
|---|---|---|---|---|
| 1 | 3-nitro-4-amino anisole | 2-hydroxy-3-naphthoic acid-2'-ethyl-4'-chloroanilide | Strong Violet | Very slightly faded. |
| 2 | 3-nitro-4-amino anisole | 2-hydroxy-3-naphthoic acid-2'-methyl-4'-chloroanilide | Weak Bordeaux | Consideraly faded. |

In a similar manner dyeings on cotton skeins impregnated with these two coupling components are produced from buffered solutions of diazotized 4-chloro-2-methyl aniline. While the dyeing derived with this diazotized base and 2-hydroxy-3-naphthoic acid-2'-ethyl-4'-chloroanilide is a strong blue shade of red the dyeing derived from the known 2-hydroxy-3-naphthoic acid-2'-methyl-4'-chloroanilide is a yellow shade of red.

EXAMPLE 5

Two cotton skeins are boiled out as described in Example 4. Skein #1 is padded in a grounding bath prepared as described in Example 4 containing 2-hydroxy-3-naphthoic acid-2'-ethyl-4'-chloroanilide and Skein #2 is padded in a similar grounding bath containing the known 2-hy-

| Coupling Component | Shade | Light Fastness Exposure | Linseed Oil Bleed | Bleed in White Lacquer |
|---|---|---|---|---|
| (1) 2-hydroxy-3-naphthoic acid-2'-methyl-4'-chloroanilide. | Dull Maroon | 101 hrs., Largely Faded | Some Bleed | Considerable bleed and staining. |
| (2) 2-hydroxy-3-naphthoic acid-2'-ethyl-4'-chloroanilide. | Bright Maroon | 101 hrs., Essentially no fading. | No Bleed | Negligible bleed and staining. | droxy - 3 - naphthoic acid-2'-ethyl-5'-chloroanilide.

(1) 25 parts by volume of diazo solution A prepared as described in Example 4 are diluted with 100 parts of water and 3.5 parts of 15% sodium acetate solution are added. Skein #1 is turned in this bath to full color development.

(2) 25 parts by volume of diazo solution A prepared as described in Example 4 are diluted with 100 parts of water and 3.5 parts of 15% sodium acetate solution are added. Skein #2 is turned in this bath to full color development.

The dyeings so obtained are summarized in the following table showing the different color obtained and the greatly improved light fastness of this product of the present invention over the known art.

| Skein No. | Diazo Component | Coupling Component | Color of Dyeing | Light Fastness, 60 Hours Exposure |
|---|---|---|---|---|
| 1 | 4-chloro-2-amino anisole | 2-hydroxy-3-naphthoic acid-2'-ethyl-4'-chloroanilide | Blue red | Very slightly faded. |
| 2 | 4-chloro-2-amino anisole | 2-hydroxy-3-naphthoic acid-2'-ethyl-5'-chloroanilide | Yellow red | Badly faded. |

When in the above procedure additional boiled out cotton skeins are padded in similar grounding baths containing the 2-hydroxy-3-naphthoic acid - 2'- ethyl-4'-chloroanilide and developing baths are similarly prepared with different diazo components other new and valuable colors are obtained.

| Diazo Component | Coupling Component | Color of Dyeing |
|---|---|---|
| (1) 2,5-dichloroaniline | 2-hydroxy-3-naphthoic acid 2'-ethyl-4'-chloroanilide. | Bright yellow red. |
| (2) o-dianisidine | do | Strong blue. |
| (3) α-naphthylamine | do | Bordeaux. |

We claim:
The water-insoluble azo dyestuff represented by the formula:

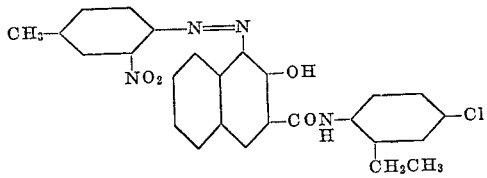

HANS Z. LECHER.
FREDERIC H. ADAMS.

REFERENCES CITED

The following references are of record in the file of this patent:

UNITED STATES PATENTS

| Number | Name | Date |
|---|---|---|
| 1,522,089 | Wagner | Jan. 6, 1925 |
| 1,915,461 | Zitscher | June 27, 1933 |
| 1,920,542 | Zitscher et al. | Aug. 1, 1933 |
| 1,942,865 | Laska et al. | Jan. 9, 1934 |
| 1,973,013 | Muth | Sept. 11, 1934 |
| Re. 19,527 | Laska et al. | Apr. 9, 1935 |
| 2,013,723 | Zwilgmeyer | Sept. 10, 1935 |
| 2,023,591 | Hitch et al. | Dec. 10, 1935 |
| 2,180,297 | Laska et al. | Nov. 14, 1939 |

FOREIGN PATENTS

| Number | Country | Date |
|---|---|---|
| 286,274 | Great Britain | May 30, 1929 |